US012103044B1

(12) United States Patent
Currey

(10) Patent No.: US 12,103,044 B1
(45) Date of Patent: Oct. 1, 2024

(54) RAKE FOR A MECHANICAL SCREENING BUCKET

(71) Applicant: Albert Ben Currey, Phoenix, AZ (US)

(72) Inventor: Albert Ben Currey, Phoenix, AZ (US)

( * ) Notice: Subject to any disclaimer, the term of this patent is extended or adjusted under 35 U.S.C. 154(b) by 0 days.

(21) Appl. No.: 18/640,512

(22) Filed: Apr. 19, 2024

(51) Int. Cl.
*B07B 1/15* (2006.01)
*B07B 1/52* (2006.01)

(52) U.S. Cl.
CPC ................ *B07B 1/526* (2013.01); *B07B 1/15* (2013.01)

(58) Field of Classification Search
CPC . E02F 3/144; E02F 3/404; E02F 3/405; E02F 3/407; B07B 1/14; B07B 1/15; B07B 1/526
See application file for complete search history.

(56) References Cited

U.S. PATENT DOCUMENTS 1,941,147 A * 12/1933 Johlige ..................... B07B 1/15 209/672
4,972,960 A * 11/1990 Bielagus .................. D21D 5/02 209/672
8,360,249 B1 * 1/2013 Currey ...................... E02F 7/06 209/672
9,481,014 B2 * 11/2016 Rautamies ................ B07B 1/15
9,616,464 B1 * 4/2017 Currey ...................... E02F 7/06
11,432,463 B2 * 9/2022 DeMont ................. A01D 69/03
2024/0052591 A1 * 2/2024 Risi ......................... E02F 3/407

* cited by examiner

*Primary Examiner* — Joseph C Rodriguez

(74) *Attorney, Agent, or Firm* — Schmeiser, Olsen & Watts LLP

(57) ABSTRACT

A rake assembly for use with an agitating screen of a mechanical screening bucket is provided. The rake assembly may include a rake bar and a plurality of tines coupled to the rake bar. Each tine may include a first end comprising an arc shaped surface, wherein the arc shaped surface is configured to engage a circular disc spacer between agitating discs of an agitating shaft of an agitating screen. The arc shaped surface corresponds to an arc shape of the circular disc spacer. Each tine may further include a second end opposite the first end, wherein the second end may include a notch formed therein. Each tine may be coupled to the rake bar by the notch. The rake assembly scrapes debris stuck in the agitating shafts in response to operation of the agitating screen.

11 Claims, 7 Drawing Sheets

RAKE FOR A MECHANICAL SCREENING BUCKET

BACKGROUND OF THE INVENTION

Technical Field

This invention relates generally to cleaning scrapers for agitating shafts of a mechanical screening bucket and more particularly to a rake for use with agitating shafts of a mechanical screening bucket.

State of the Art

Mechanical screening buckets are operated by an excavator or other like vehicle. The mechanical screening buckets include an agitating screen that includes multiple agitating shafts, each shaft comprising agitating discs coupled to an agitating shaft. There are spaces between the agitating discs through which material is screened when the agitating shaft shafts rotate, thereby screening smaller material that can fit through the spaces while retaining the larger material within the bucket portion of the mechanical screening bucket. Debris collects or becomes lodged in particular components of the agitating screen and hinders proper functionality of the agitating screen. This can be a particular problem when screening wet material, sticky material, mud, fine material, and other types of material that can collect easily on the agitating screen components. Conventional solutions for this is to utilize a scraper or rake that includes straight rectilinear tines that extend into the spaces between the agitating discs and operate to scrape the collected debris and material away from the agitating screen components. However, these conventional rakes suffer from wearing out quickly and break, and further lack the ability to compensate for variations in the surfaces of the agitating disc.

Accordingly, there is a need for an improved rake for use with agitating screens of mechanical screening buckets that overcome the deficiencies of existing rakes.

SUMMARY OF THE INVENTION

An embodiment includes a rake assembly for use with an agitating screen of a mechanical screening bucket, the rake assembly comprising: a rake bar; and a plurality of tines coupled to the rake bar, each tine comprising a first end comprising an arc shaped surface, wherein the arc shaped surface is configured to engage a circular disc spacer between agitating discs of an agitating shaft of an agitating screen, the arc shaped surface corresponding to an arc shape of the circular disc spacer.

Another embodiment includes a mechanical screening bucket comprising: a bucket portion comprising an opening on one end and an agitating screen coupled to an end opposite the opening with a screen frame, the agitating screen having a plurality of agitating shafts; and a plurality of rake assemblies operatively coupled to the agitating screen by mounting brackets, wherein each rake assembly comprises: a rake bar; and a plurality of tines coupled to the rake bar, each tine comprising a first end comprising an arc shaped surface, wherein the arc shaped surface is configured to engage a circular disc spacer between agitating discs of an agitating shaft of an agitating screen, the arc shaped surface corresponding to an arc shape of the circular disc spacer.

Another embodiment includes a method of scraping debris stuck in an agitating screen, the method comprising: operatively coupling a plurality of rake assemblies to an agitating screen, wherein: the agitating screen comprises a plurality of agitating shafts and a number of plurality of rake assemblies is equal to a number of the plurality of agitating shafts; and each rake assembly comprises a plurality of tines, each tine having an end comprising an arc shaped surface, wherein the arc shaped surfaces of the plurality of tines engage circular disc spacers between agitating discs of the plurality of agitating shafts, the arc shaped surfaces corresponding to arc shapes of the circular disc spacers; operating the agitating screen to screen material; and scraping debris stuck in the plurality of agitating shafts in response to operation of the agitating screen while the plurality of tines of the plurality of rake assemblies engage the circular disc spacers.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a rake assembly for use with a mechanical screening bucket, wherein the rake assembly operates to scrape away material and debris that has collected on the agitating screen, particularly within the screening spaces of agitating shafts of the agitating screen.

Figure 5A:
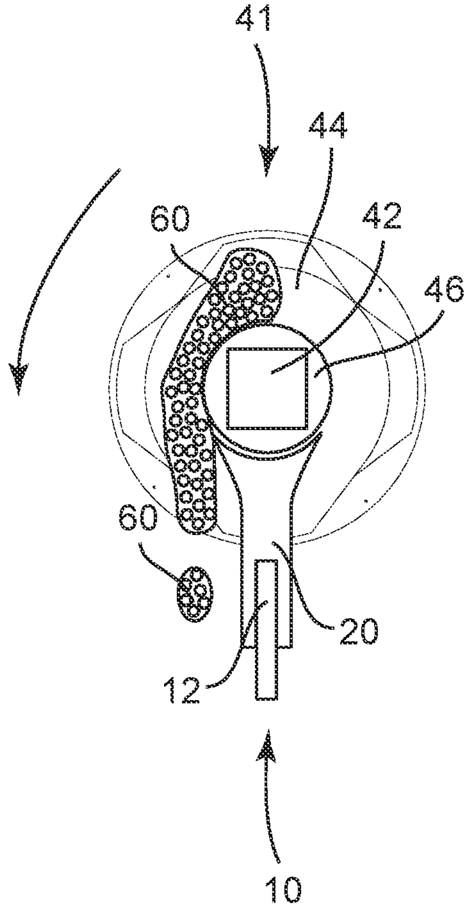
FIG. 5A is a side view of a tine engaged with a circular disc spacer of an agitating shaft according to an embodiment.
Figure 5B:
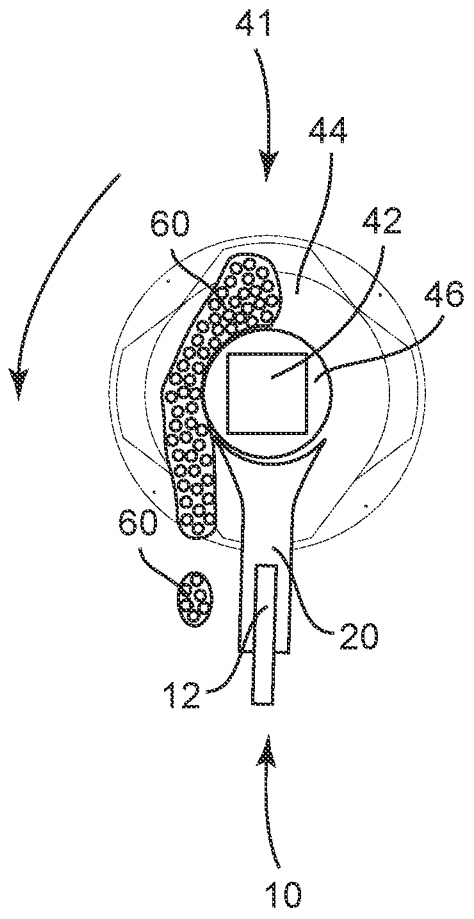
FIG. 5B is a side view of a tine engaged with a circular disc spacer of an agitating shaft according to an embodiment.
Figure 6:
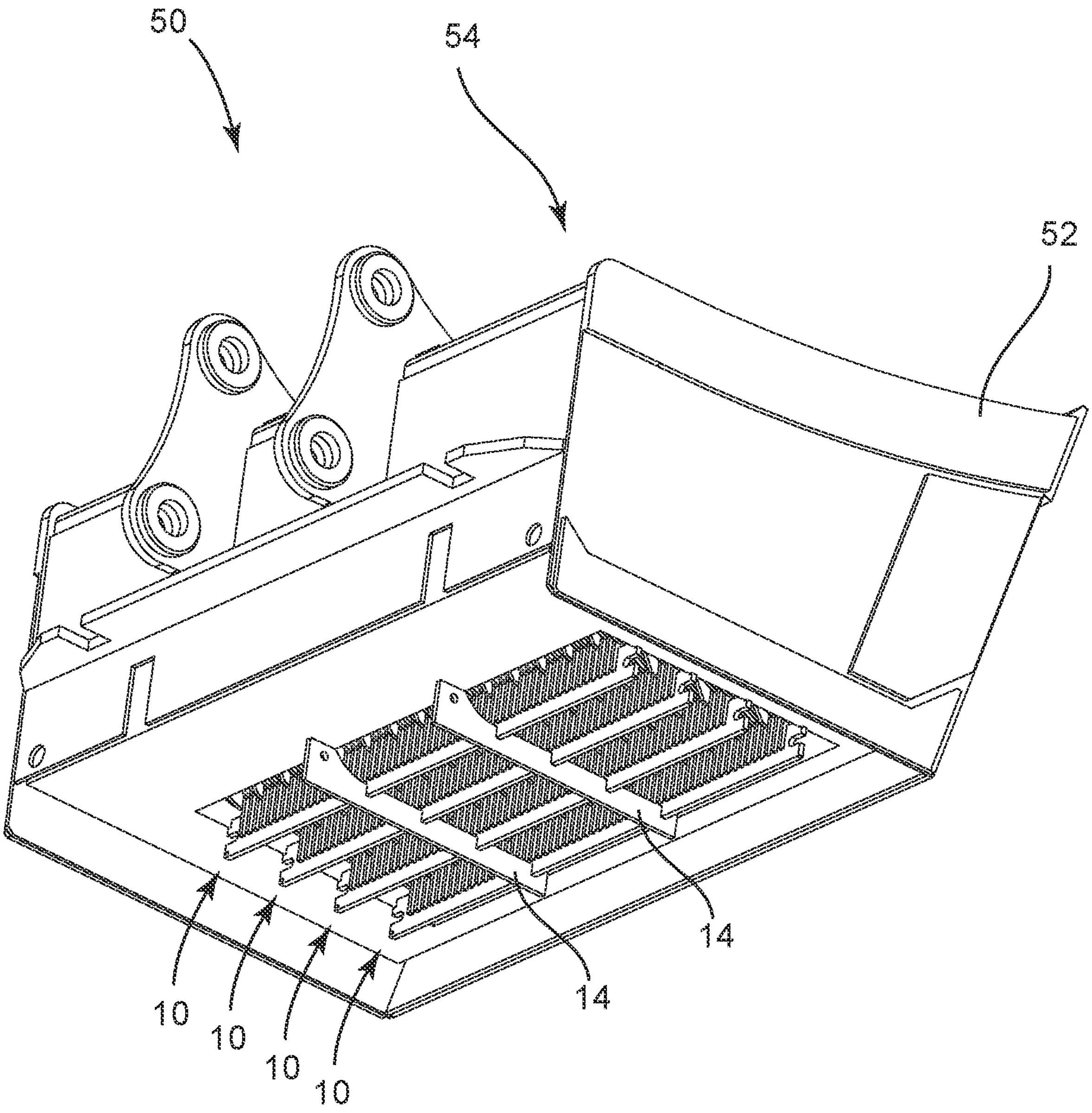
FIG. 6 is a perspective view of a plurality of rakes coupled to a mechanical screening bucket according to an embodiment.

Referring to the drawings, FIGS. 1-6 depict an embodiment of multiple rake assemblies 10 for use with an agitating screen 40 of a mechanical screening bucket 50 (see FIG. 6). Each rake assembly 10 comprises a rake bar 12 a plurality of tines 20 that are coupled to the rake bar 12. The agitating screen 40 comprises multiple agitating shafts 41. Each agitating shaft 41 comprises a shaft 42, a plurality of agitating discs 44 and a plurality of circular disc spacers 46. Further the agitating shaft 41 comprises spaces 48 between adjacent agitating discs 44, each space 48 corresponding to the width of each circular disc spacer 46, wherein the circular disc spacer 46 sets the screening size of the material to be screened using the agitating screen 40. The number of rake assemblies 10 utilized corresponds to the number of agitating shafts 41 within the agitating screen 40. Additionally, the number of tines 20 of the rake assembly 10 corresponds to the number of circular disc spacers 46 on an agitating shaft 41.

Figure 4:
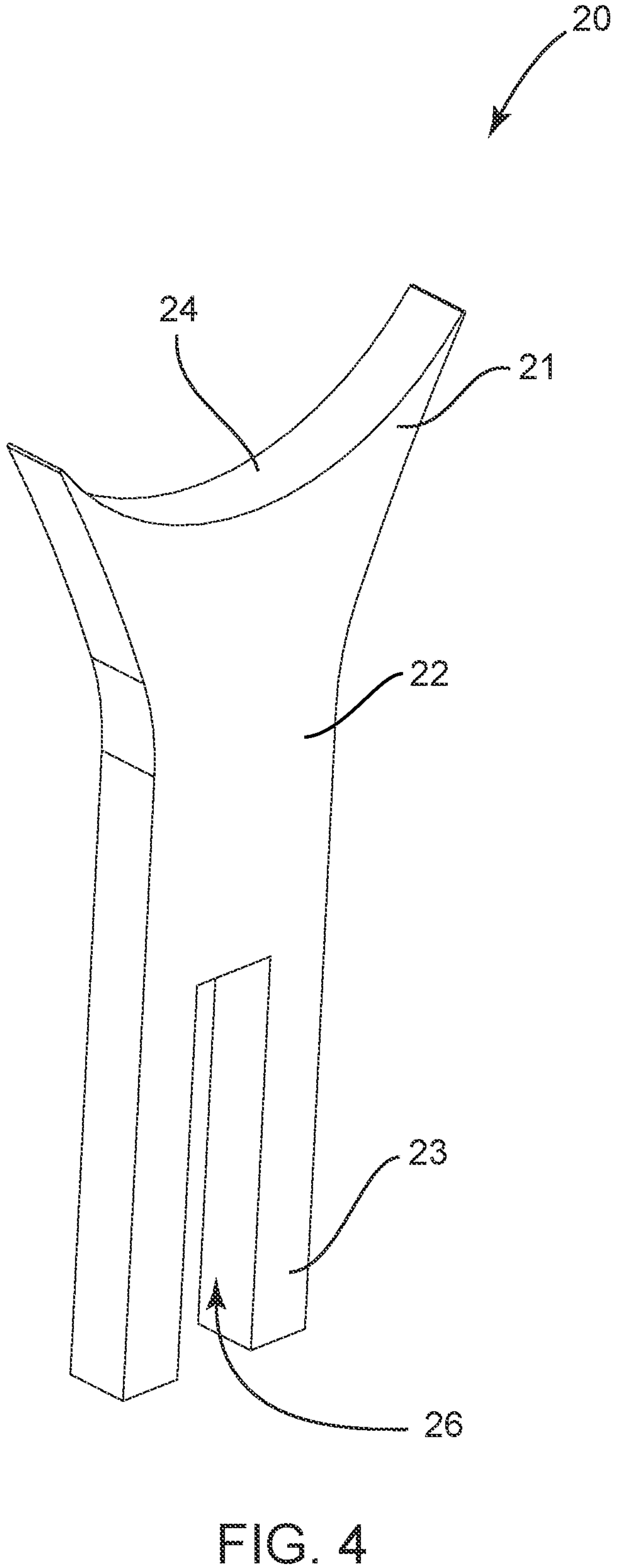
FIG. 4 is a perspective view of a tine of a rake assembly for use with a mechanical screening bucket according to an embodiment.

Referring specifically to FIG. 4, each tine 20 comprises a first end 21 and an opposite second end 23. The first end 21 may comprise arc shaped surface 24, wherein the arc shaped surface 24 is configured to engage a circular disc spacer 46 of an agitating shaft 41 between agitating discs 44. The arc shaped surface 24 corresponds to an arc shape of the circular disc spacer 46 of the agitating shaft 41 that is located between agitating discs 44.

Figure 1:
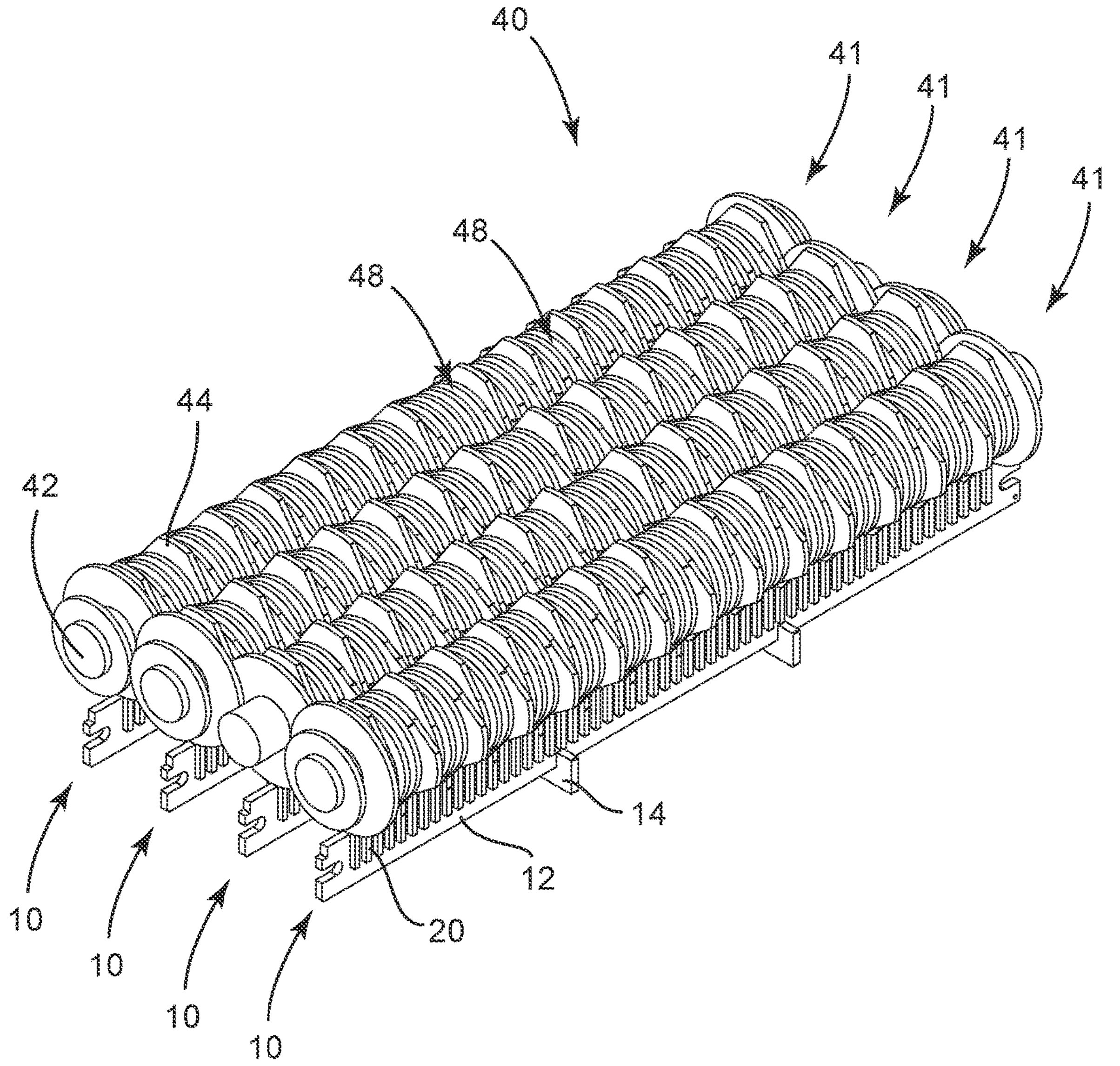
FIG. 1 is a perspective view of an agitating screen with multiple rake assemblies according to an embodiment.
Figure 2:
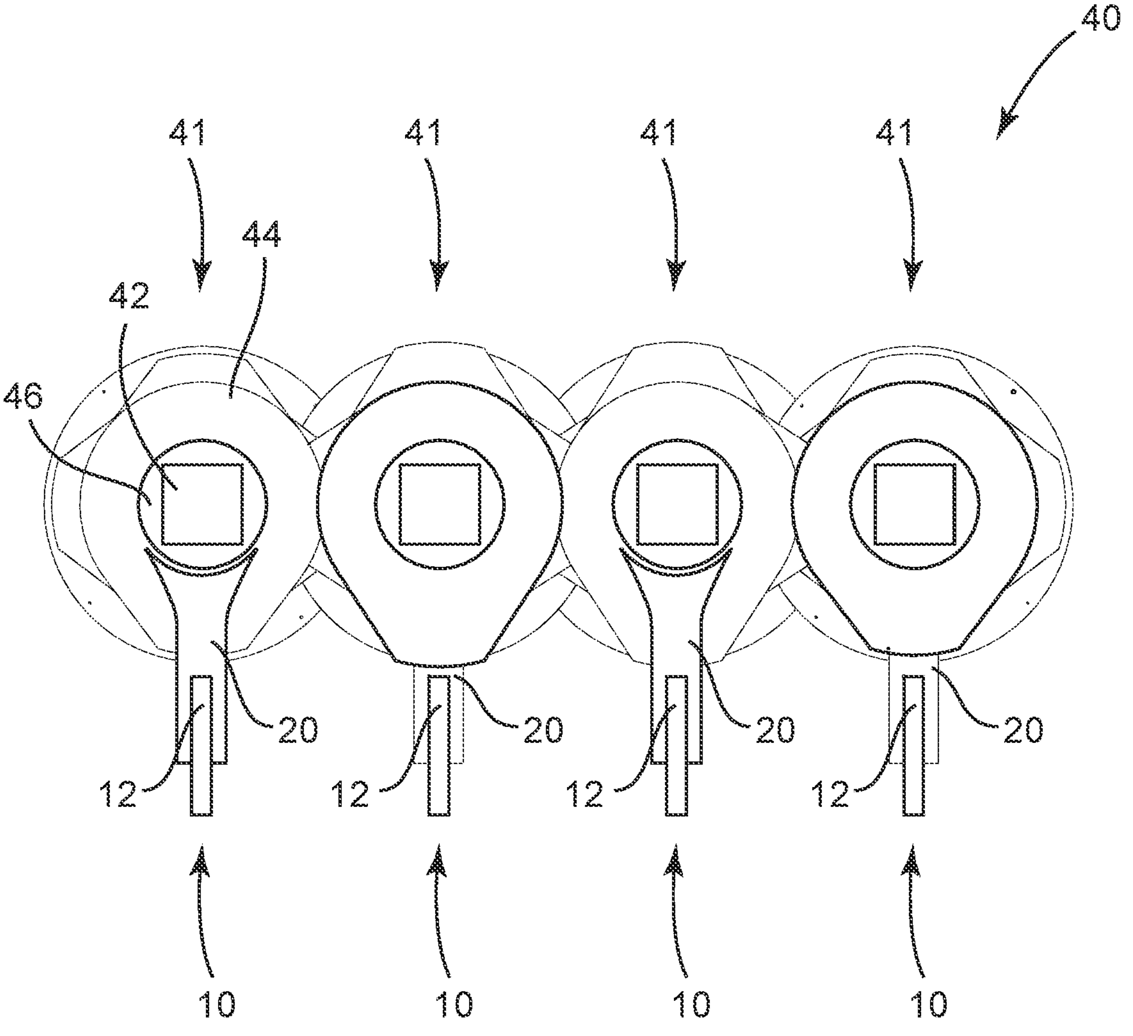
FIG. 2 is a side section view of an agitating screen with multiple rake assemblies according to an embodiment.
Figure 3:
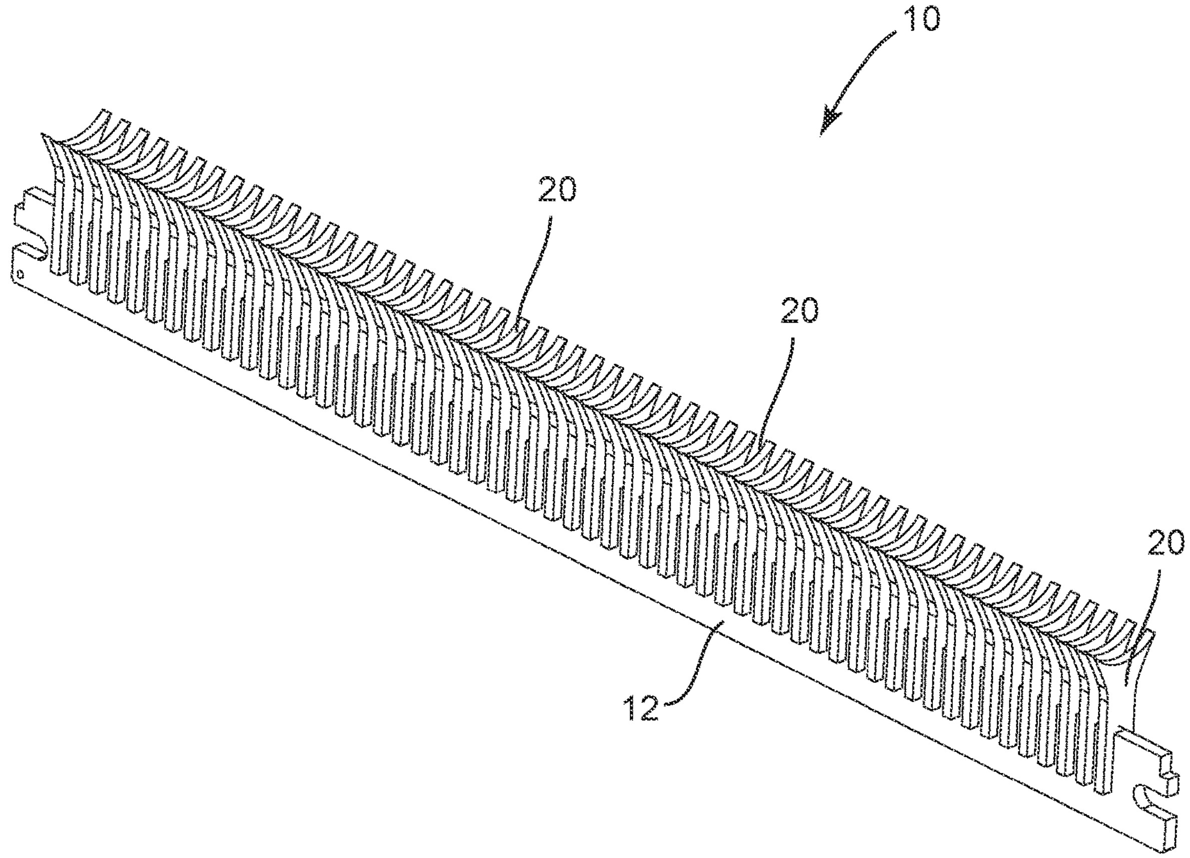
FIG. 3 is a perspective view of a rake assembly for use with a mechanical screening bucket according to an embodiment.

The second end 23 comprises a notch 26 formed in the second end 23. The notch 26 may extend from an end surface of the second end 23 of the tine 20. The notch 26 allows each tine 20 to be coupled to the rake bar 12 by use of the notch 26. For example, as shown in FIG. 3, the rake bar 12 comprises a rectilinear shaped cross section and the notch 26 of each tine 20 comprises a rectilinear shape corresponding to the rectilinear shaped cross section of the rake bar 12. While the tine 20 is shown in the drawings with the notch 26, the tine 20 may be coupled to the rake bar 12 in other ways, so long as the arc shaped surface 24 engages the circular disc spacer 46.

Referring specifically to FIGS. 3-5, each tine 20 may be coupled to the rake bar 12 by inserting the rake bar 12 into the notch 26 of each tine 20. Each tine 20 is not fixed in a specific location on the rake bar 12, causing the tines 20 to "float" meaning that the tines are not fixedly coupled to the rake bar 12 and the tines are allowed to move with respect to the rake bar 12. This is due to the tolerance of the tines 20 of the rake assembly 10 and the tolerance of the openings between the agitating discs 44. This reduces wear of the tines 20 by moving the tines 20 and preventing extra friction or binding between the agitating discs 44 and the tines 20.

Further, as shown in FIGS. 5A and 5B, the arc shaped surface 24 of the tines 20 operate to resist wear of the plurality of tines 20. The arc shaped surface 24 corresponds to the arc shape of the circular disc spacer 46 and operates to reduce deflection of the tines 20 when scraping debris 60 that is stuck or built up on the agitating shafts 41 in response to the arc shaped surface 24 contacting the circular disc spacer 46 and preventing additional deflection and damage by the debris 60 pushing the arc shaped surface 24 in contact with the circular disc spacer 46, as shown in FIG. 5B, to better scrape material and reducing wear compared to straight blunt rake tines that are conventionally used. The arc shaped surface 24 of each tine 20 corresponding to the arc shape of the circular disc spacers 46 allow the components to move against each other without interference.

The rake assembly 10, as shown in FIG. 6, operates with a mechanical screening bucket 50. The mechanical screening bucket 50 may include a bucket portion 52 comprising an opening 54 on one end and an agitating screen 40 coupled to an end opposite the opening 54. The plurality of rake assemblies 10 are operatively coupled to the agitating screen 40 by mounting brackets 14, such as, but not limited to, coupling the plurality of rake assemblies 10 to a screen frame (not shown) that the agitating screen 40 is coupled to. These brackets 14 retain the plurality of rake assemblies 10 in the proper location for operation to scrape debris from the agitating shaft 41.

Another embodiment includes a method of scraping debris stuck in an agitating screen. The method comprises operatively coupling a plurality of rake assemblies to an agitating screen, wherein: the agitating screen comprises a plurality of agitating shafts and a number of plurality of rake assemblies is equal to a number of the plurality of agitating shafts; and each rake assembly comprises a plurality of tines, each tine having an end comprising an arc shaped surface, wherein the arc shaped surfaces of the plurality of tines engage circular disc spacers between agitating discs of the plurality of agitating shafts, the arc shaped surfaces corresponding to arc shapes of the circular disc spacers; operating the agitating screen to screen material; and scraping debris stuck in the plurality of agitating shafts in response to operation of the agitating screen while the plurality of tines of the plurality of rake assemblies engage the circular disc spacers. Additionally, the method further comprises resisting wear of the plurality of tines in response to the arc shaped surface engages the circular disc spacers regardless of which direction the agitating shafts turn.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A rake assembly for use with an agitating screen of a mechanical screening bucket, the rake assembly comprising:
- a rake bar; and
- a plurality of tines coupled to the rake bar, each tine comprising:
  - a first end comprising an arc shaped surface, wherein the arc shaped surface is configured to engage a circular disc spacer between agitating discs of an agitating shaft of an agitating screen, the arc shaped surface corresponding to an arc shape of the circular disc spacer; and
  - a second end opposite the first end, the second end comprising a notch formed in the second end, wherein each tine is coupled to the rake bar by the notch.

2. The rake assembly of claim 1, wherein rake bar comprises a rectilinear shaped cross section.

3. The rake assembly of claim 2, wherein the notch of each tine comprises a rectilinear shape corresponding to the rectilinear shaped cross section of the rake bar.

4. The rake assembly of claim 3, wherein each tine is coupled to the rake bar by inserting the rake bar into the notch of each tine, wherein each tine is not fixed in a specific location on the rake bar.

5. A mechanical screening bucket comprising:
- a bucket portion comprising an opening on one end and an agitating screen coupled to an end opposite the opening with a screen frame, the agitating screen having a plurality of agitating shafts; and
- a plurality of rake assemblies operatively coupled to the agitating screen by mounting brackets, wherein each rake assembly comprises:
  - a rake bar; and
  - a plurality of tines coupled to the rake bar, each tine comprising:
    - a first end comprising an arc shaped surface, wherein the arc shaped surface is configured to engage a circular disc spacer between agitating discs of an agitating shaft of an agitating screen, the arc shaped surface corresponding to an arc shape of the circular disc spacer; and a second end opposite the first end, the second end comprising a notch formed in the second end, wherein each tine is coupled to the rake bar by the notch.

6. The mechanical screening bucket of claim 5, wherein rake bar comprises a rectilinear shaped cross section.

7. The mechanical screening bucket of claim 6, wherein the notch of each tine comprises a rectilinear shape corresponding to the rectilinear shaped cross section of the rake bar.

8. The mechanical screening bucket of claim 7, wherein each tine is coupled to the rake bar by inserting the rake bar into the notch of each tine, wherein each tine is not fixed in a specific location on the rake bar.

9. The mechanical screening bucket of claim 5, wherein the amount of the plurality of rake assemblies corresponds to an amount of the plurality of agitating shafts of the agitating screen.

10. A method of scraping debris stuck in an agitating screen, the method comprising:

operatively coupling a plurality of rake assemblies to an agitating screen, wherein:

the agitating screen comprises a plurality of agitating shafts and a number of plurality of rake assemblies is equal to a number of the plurality of agitating shafts; and each rake assembly comprises a rake bar and a plurality of tines coupled to the rake bar, wherein the plurality of tines float on the rake bar, each tine having an end comprising an arc shaped surface, wherein the arc shaped surfaces of the plurality of tines engage circular disc spacers between agitating discs of the plurality of agitating shafts, the arc shaped surfaces corresponding to arc shapes of the circular disc spacers;

operating the agitating screen to screen material; and scraping debris stuck in the plurality of agitating shafts in response to operation of the agitating screen while the plurality of tines of the plurality of rake assemblies engage the circular disc spacers.

11. The method of claim 10, further comprising resisting wear of the plurality of tines in response to the arc shaped surface engages the circular disc spacers regardless of which direction the agitating shafts turn.

* * * * *